United States Patent [19]

Smith et al.

[11] 4,022,661
[45] May 10, 1977

[54] FUEL ROD SUPPORT MEANS

[75] Inventors: Bart Alan Smith; Kenneth Wood Brayman; Norman Wayne Pillow, all of San Jose, Calif.

[73] Assignee: General Electric Company, San Jose, Calif.

[22] Filed: May 1, 1975

[21] Appl. No.: 573,723

[52] U.S. Cl. .................... 176/79; 176/76; 176/81; 176/87
[51] Int. Cl.² .......................................... G21C 3/10
[58] Field of Search .............. 176/76, 78, 79, 87, 176/81

[56] References Cited

UNITED STATES PATENTS

| | | | |
|---|---|---|---|
| 2,914,454 | 11/1959 | Gurinsky et al. | 176/78 |
| 3,072,552 | 1/1963 | Fortescue et al. | 176/79 X |
| 3,111,475 | 11/1963 | Davidson | 176/78 X |
| 3,182,003 | 5/1965 | Thorp et al. | 176/78 |
| 3,262,860 | 7/1966 | Zebrowski | 176/78 |
| 3,274,069 | 9/1966 | Alfille | 176/79 X |
| 3,274,071 | 9/1966 | Janusz et al. | 176/79 X |
| 3,331,749 | 7/1967 | Anthony et al. | 176/78 |
| 3,349,004 | 10/1967 | Lass et al. | 176/78 |
| 3,379,618 | 4/1968 | Frisch | 176/78 |
| 3,864,211 | 2/1975 | King et al. | 176/76 X |

*Primary Examiner*—Samuel W. Engle
*Assistant Examiner*—Peter A. Nelson
*Attorney, Agent, or Firm*—Ivor J. James, Jr.; Samuel E. Turner; Sam E. Laub

[57] ABSTRACT

Means are provided to minimize crud buildup at the interface between the tie plate and end plug in a nuclear fuel bundle. The means may comprise serrations in the end plug and/or serrations in the surface of the tie plate which serrations provide a flow of coolant through the end plug receptacles. A bleed hole extending into the interior of the tie plate may be provided to provide coolant circulation through any blind holes that may be in a tie plate.

5 Claims, 6 Drawing Figures

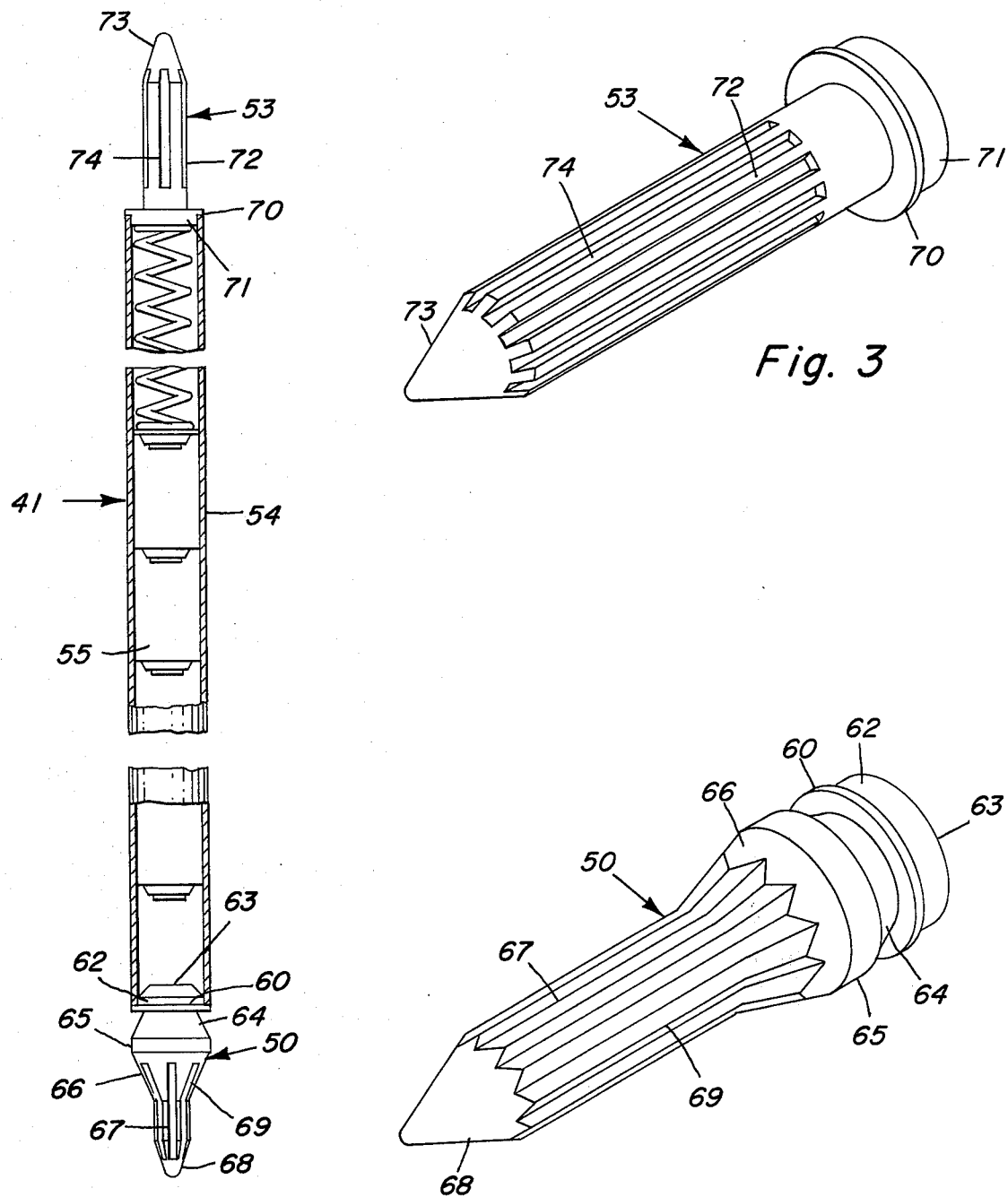

FUEL ROD SUPPORT MEANS

BACKGROUND OF THE INVENTION

This invention relates generally to nuclear reactors and, more specifically, to a means to prevent crud buildup at the interface of the end plug and tie plate in a fuel bundle for a nuclear reactor.

The release of large amounts of energy through nuclear fission reactions is now quite well known. Nuclear reactors are presently being designed, constructed, and operated in which the nuclear fuel is contained in the fuel elements which may have various shapes, such as plates or rods. For convenience these fuel elements will hereinafter be referred to as fuel rods. These fuel rods are usually provided on their external surfaces with a corrosion-resistant nonreactive cladding. The fuel rods are grouped together at fixed distances from each other in a coolant flow channel or region as a fuel bundle, and a sufficient number of these fuel bundles are combined to form a nuclear reactor core capable of the self-sustained fission reaction. The core is ordinarily contained within a reactor vessel. Such nuclear reactors are now widely known and are discussed in greater detail by, for example, M. M. El-Wakil, "Nuclear Power Engineering", McGraw-Hill Book Company, Inc., 1962.

In general, nuclear power plants are designed for periodic shutdown to refuel the reactor core. This is referred to as "reloading" the reactor and is performed by replacing part or all of the irradiated fuel with unused reload fuel. Typically, the reload schedule is arranged for reactor shutdown during those periods when power demands on the overall power grid are at a minimum. The scheduled reload may typically require that 20 to 25 percent of the irradiated fuel be removed from the reactor core and replaced with reload fuel. Therefore, for 25 percent annual reloads, there will be four reload shutdown cycles resulting in a complete replacement of the original fuel at the end of four cycles of normal operation.

The nuclear design of the reload fuel is fixed many months (12 months is not unusual) before loading the reload fuel into the reactor. The major portion of this lead time is required for nuclear design, manufacturing, licensing and delivery of the reload fuel. It is very important to note that the nuclear design of the reload fuel is based on the condition of the reactor that is predicted to exist at the date of the scheduled reload. The basic conditions which must be considered in designing the reload fuel are: (1) the reactivity condition of the reactor core and remaining fuel, (2) the design lifetime and reactivity of the reload fuel, (3) the control rod strength (the neutron absorption effectiveness of the control rod), and (4) the desired shutdown margin (the control rod system strength over and above that required to shut down the reactor).

Since the reload fuel is designed many months in advance, there is a substantial likelihood that the nuclear design will not strictly meet the needs of the reactor at the time of reactor shutdown if unexpected deviations from originally predicted conditions occur. Such deviations may result, for example, from operating at power levels above or below that assumed for the period. From an economic operation standpoint, it would be very desirable to change the characteristics of the reload fuel to accommodate these deviations in order that the reload fuel meet the needs of the reactor as closely as possible. Once the reload fuel has been manufactured to a design correct for the assumed reactor conditions, there have been available prior to the present invention, only very limited and laborious techniques for changing the nuclear characteristics of reload fuel to accommodate the deviations from the assumed conditions so as to meet the needs of the reactor actually encountered at the time of shutdown for refueling. In such situations the time and expense required to alter the reload fuel bundles may be such as to require the use of the unmodified reload fuel under inefficient conditions. It may also require the unplanned exchange of control rods to increase or decrease their reactivity worth, or it may require the rearranging of fuel bundles in the core, or both. These situations can often require excessive expenditures of money, extended shutdown of the reactor power plant or other inconveniences which are detrimental to the economic and efficient operation of a nuclear reactor power plant.

In addition, it is sometimes necessary to remove the irradiated fuel bundles from the reactor prior to the completion of their scheduled exposure period. This unscheduled removal may be due to such factors as mechanical failure of one or more of the fuel rods in the fuel bundles or unexpected changes in the physics characteristics or requirements of the fuel bundle or reactor core. It had been general practice in these situations to scrap the fuel bundle since it was radioactive and could not be readily modified or repaired. In U.S. Pat. No. 3,431,170, issued on Mar. 4, 1969, to James L. Lass and Dominic A. Venier, and assigned to the assignee of this invention, there is disclosed an improved fuel bundle which may be readily repaired or modified while the fuel bundle is in the reactor core or when it is in a separate containment such as a water pool adjacent the reactor vessel. That fuel bundle included an easily removable upper tie plate and a plurality of easily removable fuel rods which may be removed or inserted after removal of the upper tie plate. This was achieved by employing specially designed upper and lower fuel rod end plugs and a removable locking mechanism for the upper tie plate. The lower end plugs were shaped to permit insertion and withdrawal of the fuel rod without binding or catching on the fuel bundle spacers. This was achieved by the unique cooperation between a self-centering cylindrical surface area and specially formed conical surfaces. The upper end plugs were shaped to receive detachable tooling which could be attached thereto to raise and lower the fuel rods.

Operating experience has shown a tendency for the buildup of contaminants (referred to as "crud" by those skilled in the art) in the area where the end plugs mate with the tie plates. The crud tends to bind the end plug and tie plate together thereby hampering their separation and removal of the fuel rod from the bundle.

Accordingly, it is an object of this invention to provide a means to minimize crud buildup during reactor operation at the interface between the end plug and the tie plate.

SUMMARY OF THE INVENTION

Briefly stated, in accordance with one aspect of the invention, there is provided, in a fuel bundle for a nuclear reactor having a plurality of fuel rods supported between spaced tie plates, wherein coolant flows through the tie plates and past the fuel rods, the improvement comprising an end plug disposed between an end of each fuel rod and the adjacent tie plate and means defining a passage for the flow of coolant through the interface between the end plug and the tie plate whereby this flow of coolant minimizes crud buildup at the interface. In a specific embodiment of the invention, the means defining a passage comprises serrations in either the end plug or the tie plate. In the event that the end plug receptacle is a blind hole in the tie plate a bleed hole may be provided in the tie plate extending into the interior of the mating hole formed within the tie plate to receive the end plug to thus provide the desired coolant flow.

BRIEF DESCRIPTION OF THE DRAWING

While the specification concludes with claims particularly pointing out and distinctly claiming the subject matter which is regarded as the invention, it is believed the invention will be better understood from the following description of the preferred embodiment taken in connection with the accompanying drawings, in which:

FIG. 2 is an enlarged view in partial section of a removable fuel rod employing the present invention;

FIG. 3 is an enlarged perspective view of an upper end plug of the present invention;

FIG. 4 is a view similar to FIG. 3 showing a lower end plug;

DESCRIPTION OF THE PREFERRED EMBODIMENT

Figure 1:
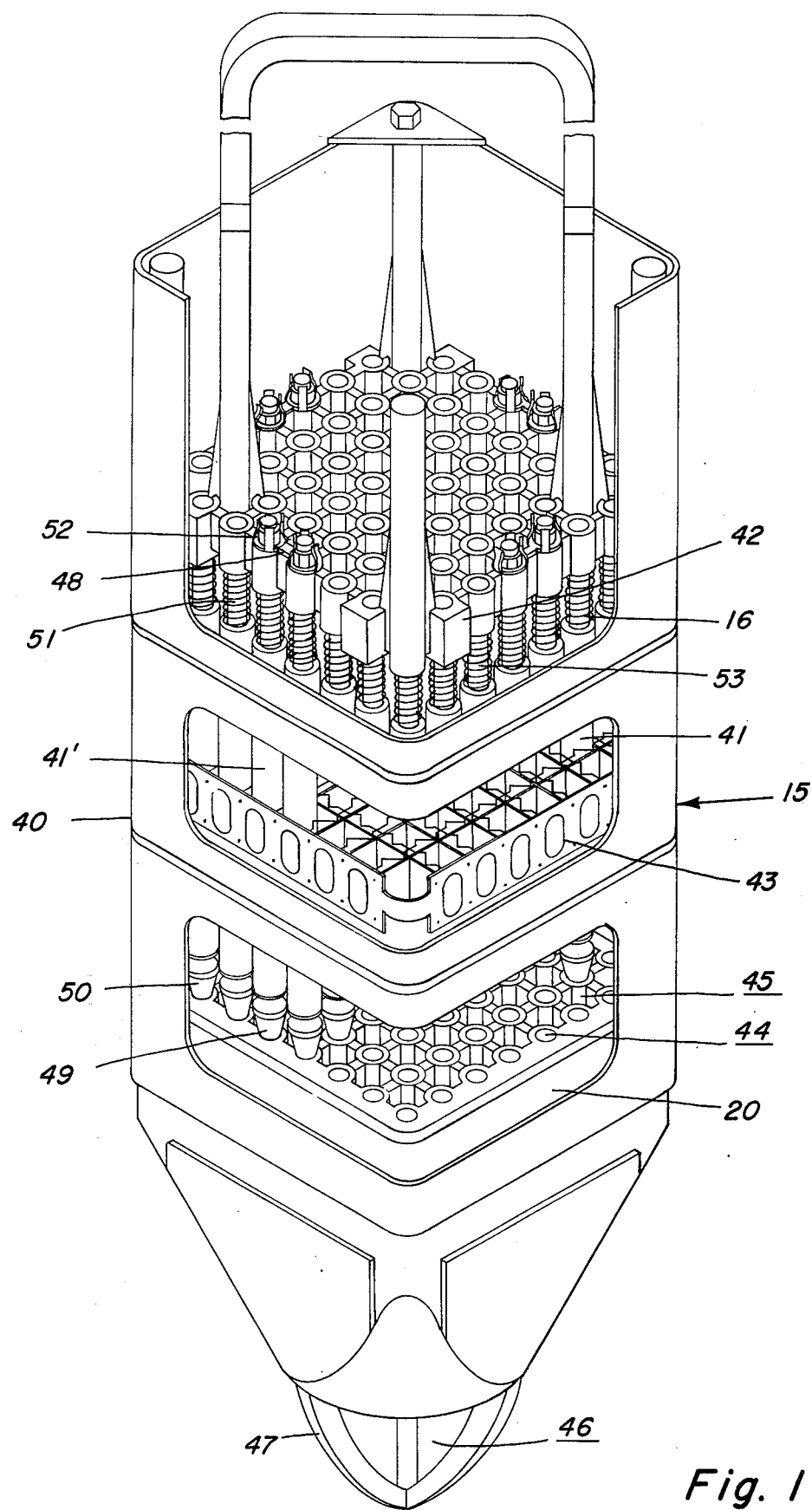
FIG. 1 is a perspective view, partially cut away to show details, of a fuel bundle with which the present invention may be employed.

In FIG. 1, there is illustrated the removable rod fuel bundle of the present invention. Fuel bundle 15 generally consists of open ended tubular channel 40, fuel rods 41, lower tie plate 20, upper tie plate 42, and fuel rod spacers 43. Fuel rods 41 extend through and are supported in spaced relation by a plurality of fuel rod spacers 43 which rest against the interior surface of tubular channel 40. These fuel rod spacers are separated from one another a predetermined distance along the bundle, for example, one and one-half feet, and are connected to one or more of the fuel rods to prevent longitudinal movement. This connection may be achieved by various means such as the attachment of locking devices to one of the fuel rods at these same predetermined distances.

Each fuel rod 41 comprises an elongated tube containing a fissionable fuel material such as enriched uranium dioxide ($UO_2$). The fuel material is typically in the form of high density pellets placed end to end in the tube; however, it may be in the form of a compacted mass of high density powder or particles. Each end of the tube is sealed to prevent the coolant from contacting the fuel and to prevent fission products from escaping the fuel rod.

The lower ends of the fuel rods are supported by lower tie plate 20 and register with receptacles 44 which are formed in the lower tie plate. Openings 45 are positioned adjacent these receptacles and communicate directly with lower opening 46. The lower end of tubular channel 40 fits down around the upper end of the lower tie plate. The lower end of the lower tie plate is a tapered transition fixture terminating in an open nose-piece 47 of circular cross section and, when mounted in the reactor, rests in a suitable socket of a fuel bundle support arrangement in the reactor vessel (not shown) whereby a supply of pressurized coolant is received through the opening 46 to flow upward through the channel 40 past the fuel rods 41.

Removable upper tie plate 42 includes four locking mechanisms 48. Each of these locking mechanisms is operatively connected to two tie fuel rods 41'. The fuel bundle of the present invention includes two basic types of removable fuel rods. These are (1) removable tie fuel rods 41' and (2) removable fuel rods 41. The upper and lower tie plates are held together by the removable tie fuel rods 41', and removable fuel rods 41 are supported between the upper and lower tie plates. All of the fuel rods are provided with lower end plugs 49 or 50 the details of which will be hereinafter described, that are shaped to permit insertion and withdrawal of the fuel rods without binding or catching on fuel rod spacers 43. The lower end plugs 49 of tie fuel rods 41' are threaded whereas lower end plugs 50 of fuel rods 41 are not. In addition, the upper ends of upper end plugs 51 of tie fuel rods 41' are shaped to receive removable locking mchanism 48, holding nuts 52 and tooling (not shown) for removal of these rods. The upper end plugs 53 of fuel rods 41 are shaped to fit within openings provided in the upper tie plate 42. Helical springs 16 are fitted around the upper end plugs 51 and 53 between a cylindrical collar 70 (FIG. 3) of the end plugs and the bottom side of the upper tie plate 42.

Referring to FIG. 2, fuel rod 41 includes an elongated cylindrical cladding or tube 54 which is preferably formed of zirconium material. The upper and lower ends of fuel rod 41 are closed by means of upper end plug 53 and lower end plug 50, both of which are preferably made of a zirconium material. End plugs 50 and 53 are welded or fused to the ends of tube 54 to prevent the reactor coolant from contacting the fuel and to prevent fission products from escaping the fuel rod. Disposed within tube 54 is the fuel material such as uranium dioxide for example, in the form of pellets 55 placed end to end within the tube.

Lower end plug 50 includes a cylindrical collar 60, of a diameter about equal to the outside diameter of tube 54, and an inwardly extending flange or end section 62. End section 62 is solid, has a cylindrical external surface and has a flat inner surface 63 against which the lower fuel pellet rests. Lower end plug 50 further includes a conical section 64 extending from collar 60 to a cylindrical section 65. A conical section 66 extends from cylindrical section 65 to a cylindrical section 67. Below cylindrical section 67 is a conical tip 68. Serrations 69 extend from tip 68 along cylindrical section 67 and into conical section 66. Serrations 69 will be discussed in greater detail hereinafter with reference to FIG. 4.

Upper end plug 53 is provided with a cylindrical collar 70 and an end section. Each are shaped and function in basically the same manner as collar 60 and end section 62 of lower end plug 50. A cylindrical section 72 extends upwardly from collar 70 and terminates in a conical section 73. Plug 53 is provided with serrations 74 which extend throughout most of the length of cylindrical section 72.

FIGS. 3 and 4 present perspective views of the upper and lower end plugs respectively, including detailed illustration of the serrations 74 in FIG. 3 and serrations 69 in FIG. 4. It will become evident as this description proceeds, that the particular configuration of the individual end plug is not critical to the present invention. Moreover, it is not critical to the present invention to form the serrations with any particular cross sectional configuration. Accordingly, the serrations can be triangular or rectangular in cross section and, to illustrate this, serrations 74 in FIG. 3 are shown as rectangular in cross section while serrations 69 in FIG. 4 are shown as triangular in cross section. In the preferred form, lower end plug 50 has serrations 69 extending throughout the entire length of cylindrical section 67 and partially along the length of conical section 66. It is presently believed that it would be adequate to extend the serrations only along cylindrical section 67, terminating them short of conical section 66.

Figure 5:
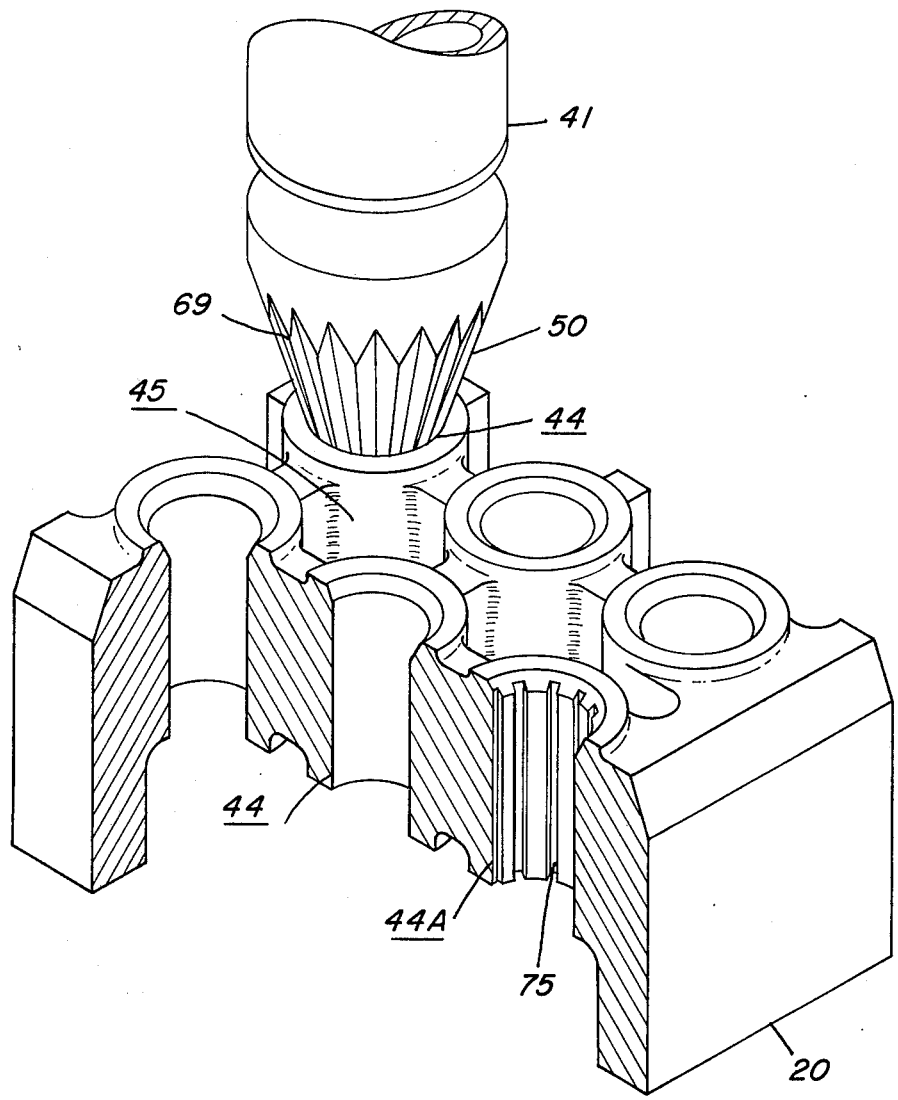
FIG. 5 is a perspective fragmentary view of the lower tie plate.

To more fully explain the purpose and function of the serrations, reference is made to FIG. 5 wherein a portion of lower tie plate 20 is illustrated. FIG. 5 shows, in greater detail, how lower end plug 50 received in hole or receptacle 44 of lower tie plate 20 as the coolant passes through the fuel bundle, entering the bundle through openings 45, there is a tendency for crud to build up at the interface between lower end plug 50 and the inner surface of receptacle 44. The primary constituent of this crud is iron oxide resulting from the iron and stainless steel pipes and hardware in the reactor system. Present practice is to allow 10 parts per billion iron in the coolant. The iron oxide thus contained in the coolant tends to plate out on high temperature surfaces and, more specifically, fuel rods, end plugs and tie plates. As discussed above, dismantling of the fuel bundle for refueling or other purposes, requires that end plug 50 be separated from receptacle 44. The crud buildup tends to create a freezing or seizing at the interface between the end plug and receptacle. This hampers removal of the fuel rod from the tie plate.

The present invention minimizes crud buildup by allowing coolant to flow through the interface between the end plug and the receptacle. Passageways are provided for this coolant flow in the preferred embodiment of the present invention by serrations 69 in the case of the lower end plug and serrations 74 in the case of the upper end plug.

It is possible to provide serrations in the receptacle surface rather than, or in addition to, serrations in the surface of the end plug. For example, in FIG. 5, receptacle 44a is illustrated as having serrations 75 therein.

Figure 6:
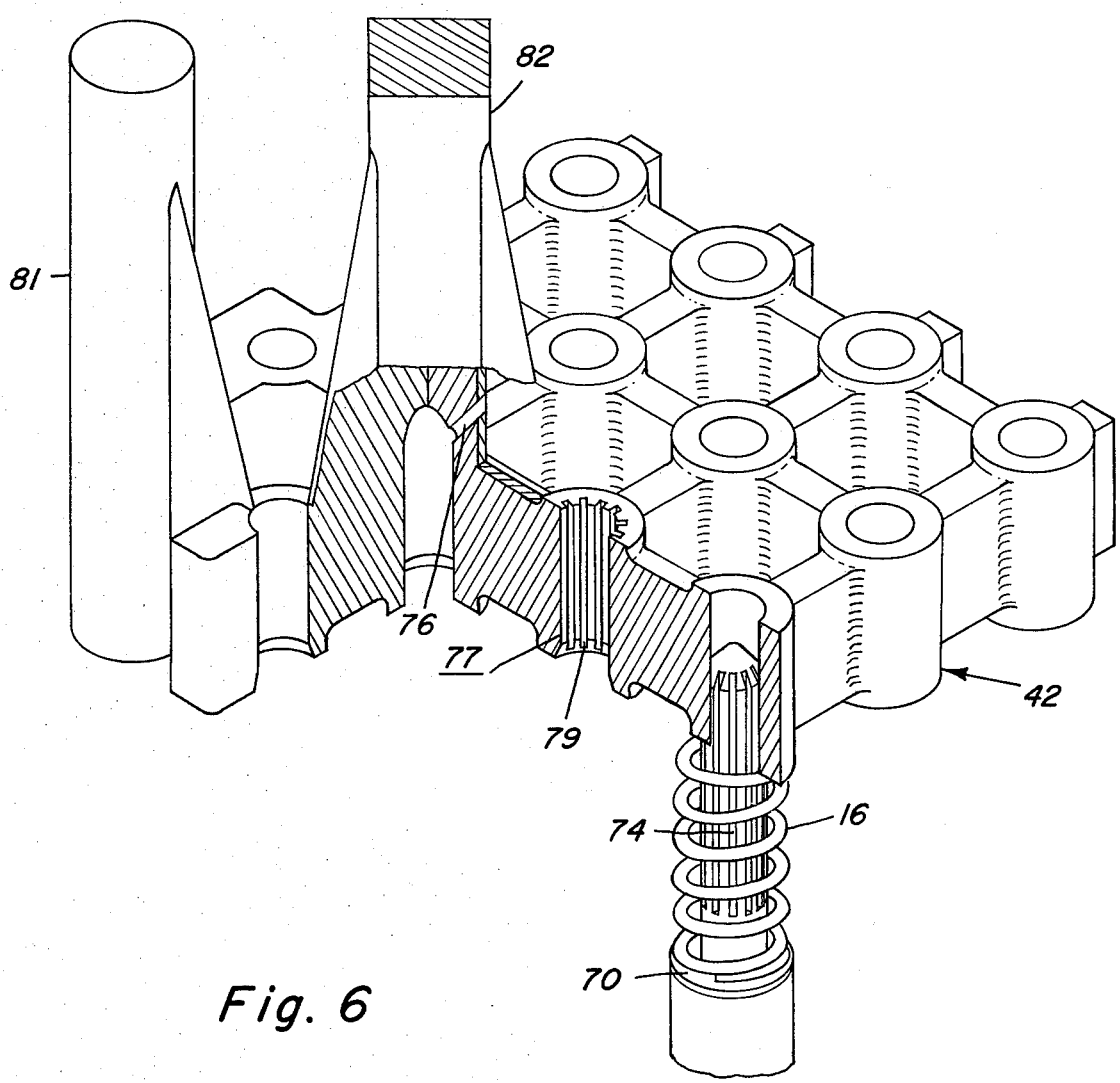
FIG. 6 is a perspective fragmentary view of the upper tie plate.

FIG. 6 shows a portion of the upper tie plate 42. As in the lower tie plate it is possible to provide serrations in the upper end plug receptacle rather than, or in addition to, the serrations in the surface of the upper end plugs. For example, an upper end plug receptacle 77 is illustrated as formed with serrations 79 therein.

Also, in the upper tie plate 42 several of the end plug receptacles are blind holes, that is, they do not pass through the upper tie plate but are closed at the upper end because of, for example, corner posts, such as post 81, and the attachment of a lifting bail 82. To provide the desired coolant flow through such blind holes a bleed hole 76 is provided.

Thus, it can be seen that the present invention provides improved means to minimize crud buildup at the interface between the end plug and tie plate of a fuel bundle in a nuclear reactor.

As will be evident from the foregoing description, certain aspects of the invention are not limited to the particular details of construction of the examples illustrated, and it is contemplated that various other modifications or applications will occur to those skilled in the art. It is therefore intended that the appended claims shall cover such modifications and applications as do not depart from the true spirit and scope of the invention.

What is claimed is:

1. In a fuel bundle for a nuclear reactor having a plurality of fuel rods supported between spaced tie plates, wherein coolant flows through said tie plates and past said fuel rods, the improvement comprising:
   an end plug disposed between an end of each fuel rod and the adjacent tie plate,
   at least one of said tie plates having at least one hole to receive one of said end plugs,
   the surface of said one tie plate defining said hole and the outer surface of said one end plug being configurated to mate with each other,
   said outer surface comprising a cylindrical portion and a continuous conical portion,
   serrations in said outer surface to define passages for the flow of coolant therethrough,
   said serrations extending unbroken along both said cylindrical and said conical portions,
   whereby said flow of coolant through said passages minimizes crud buildup at the interface between said end plug and said tie plate.

2. In a fuel bundle for a nuclear reactor having a plurality of fuel rods supported between spaced tie plates, wherein coolant flows through said tie plates and past said fuel rods, the improvement comprising:
   an end plug disposed between an end of each fuel rod and the adjacent tie plate, and
   means defining a passage for the flow of coolant through the interface between said end plug and said tie plate to minimize crud buildup at said interface said adjacent tie plate having a surface against which a surface of said end plug mates and said means comprising serrations in one of said sufaces.

3. The invention of claim 2 wherein said serrations are in the surface of said end plug and extend in a direction generally parallel with the axis of said end plug.

4. The invention of claim 2 wherein said serrations are in the surface of said tie plate and extend in a direction generally parallel with the axis of said end plug.

5. The invention of claim 2 wherein said adjacent tie plate has a blind hole formed therein to receive said end plug and including a bleed hole in said tie plate extending into the interior of said blind hole.

* * * * *